United States Patent
Ueno

(10) Patent No.: US 7,506,199 B2
(45) Date of Patent: Mar. 17, 2009

(54) METHOD AND APPARATUS FOR RECORDING AND REPRODUCING INFORMATION

(75) Inventor: Toshiharu Ueno, Asaka (JP)

(73) Assignee: FUJIFILM CORPORATION, Tokyo (JP)

( * ) Notice: Subject to any disclaimer, the term of this patent is extended or adjusted under 35 U.S.C. 154(b) by 792 days.

(21) Appl. No.: 10/829,169

(22) Filed: Apr. 22, 2004

(65) Prior Publication Data
US 2004/0216027 A1    Oct. 28, 2004

(30) Foreign Application Priority Data
Apr. 23, 2003    (JP) .............................. 2003-117914

(51) Int. Cl.
*G06F 11/00* (2006.01)

(52) U.S. Cl. .......................................... 714/6; 714/763

(58) Field of Classification Search ...................... 714/6, 714/52, 763
See application file for complete search history.

(56) References Cited

U.S. PATENT DOCUMENTS

| | | | | |
|---|---|---|---|---|
| 4,766,573 A | * | 8/1988 | Takemae | ..................... 365/222 |
| 5,086,429 A | * | 2/1992 | Gray et al. | ..................... 714/13 |
| 5,128,944 A | * | 7/1992 | Flaherty et al. | ................. 714/6 |
| 5,761,213 A | * | 6/1998 | Adams et al. | ................ 714/733 |
| 6,044,487 A | * | 3/2000 | Li | .............................. 714/797 |
| 6,233,702 B1 | * | 5/2001 | Horst et al. | .................... 714/48 |
| 6,496,940 B1 | * | 12/2002 | Horst et al. | ..................... 714/4 |
| 6,668,341 B1 | * | 12/2003 | Krauch et al. | ................. 714/52 |

FOREIGN PATENT DOCUMENTS

JP    6-52697 A    2/1994

* cited by examiner

*Primary Examiner*—Robert W Beausoliel, Jr.
*Assistant Examiner*—Amine Riad
(74) *Attorney, Agent, or Firm*—Birch, Stewart, Kolasch & Birch, LLP

(57) ABSTRACT

A method of recording and reproducing information is provided in which a recording area of a memory card is physically divided into small pages and is also partitioned into physical blocks each comprising a plurality of pages so that information is read and written in units of the blocks from and to the memory card. A logical address assigned to the physical block is added with a parity bit and is recorded in a replicated manner into each page within the block. In creating a logical/physical address translation table, all logical addresses are read from the memory card. When an error is detected in the logical addresses, a plurality of logical addresses recorded in a replicated manner into the same block as where the error is detected are read, and the logical address error is corrected based on a result of majority voting made for the plurality of read logical addresses.

2 Claims, 7 Drawing Sheets

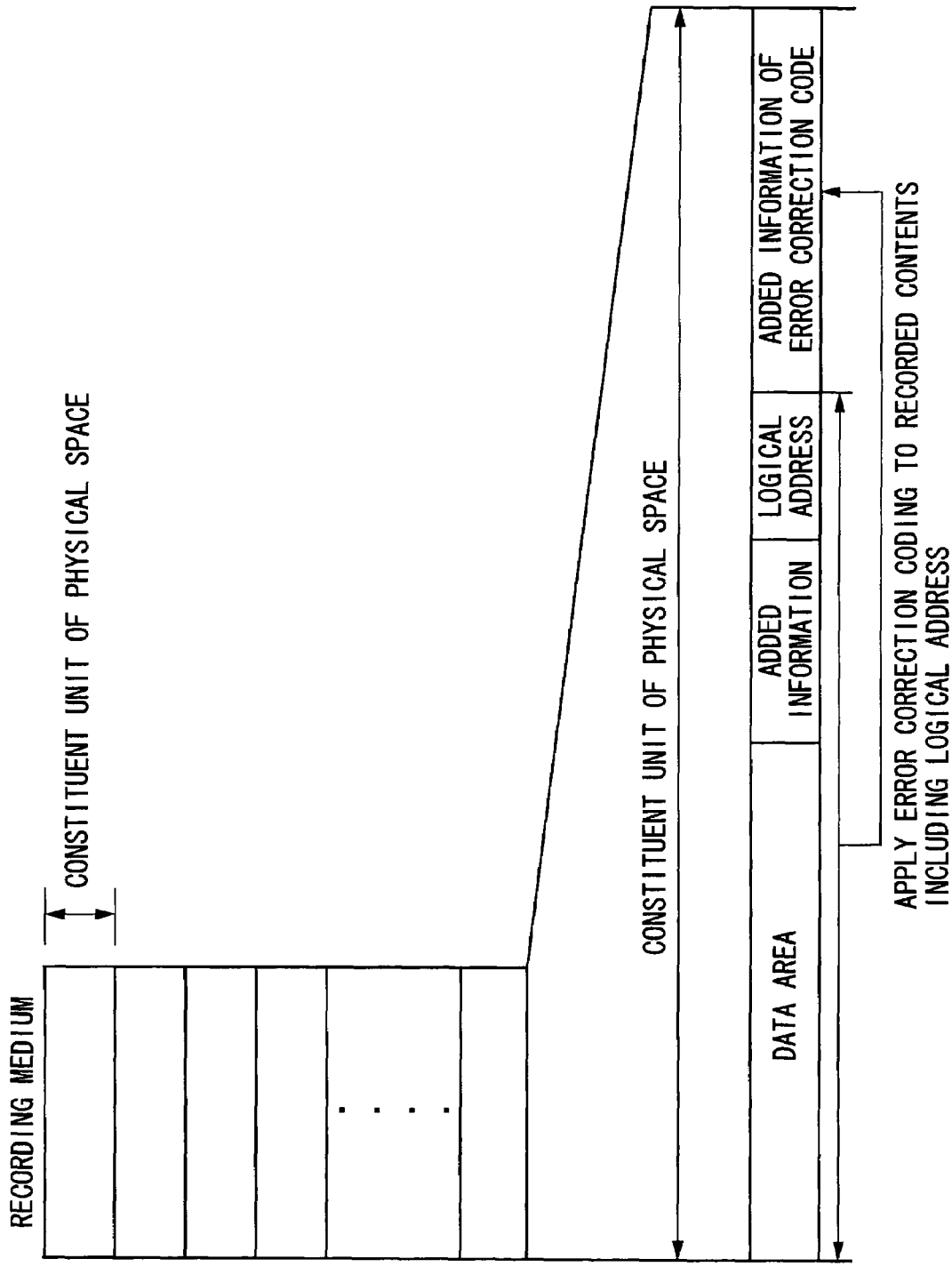

METHOD AND APPARATUS FOR RECORDING AND REPRODUCING INFORMATION

This Non-provisional application claims priority under 35 U.S.C. § 119(a) on Patent Application No(s). 2003-117914 filed in Japan on Apr.23, 2003, the entire contents of which are hereby incorporated by reference.

BACKGROUND OF THE INVENTION

1. Field of the Invention

The present invention relates to a method and apparatus for recording and reproducing information, and more particularly, to a method and apparatus for recording and reproducing information capable of achieving high-speed error correction.

2. Description of the Related Art

Generally, in recording data in a memory card, efficient data manipulation is enabled by allocation of a physical recording area to logical space. Physical-to-logical mapping is performed by a method in which, as shown in FIG. 6, a logical address is assigned to each of physical constituent units (A, B, C, . . . ). When the memory card is used, all logical addresses therein are read first, followed by creation of a logical/physical address translation table which is used for translation from logical to physical addresses thereby to allocate the recording area to the logical space, so that non-contiguously recorded data set is made contiguous in a virtual space.

During production or use of the memory card, part of its storage elements is occasionally damaged, leading to an erroneous logical address read from the card.

In order to detect and correct such erroneous data or logical address, error correction coding technique has been employed in which, as shown in FIG. 7, individual constituent units in the physical space include extra redundant data which is an error correcting code, such as Reed Solomon code, calculated for a set of data, added information and logical address, so as thereby to correct the error using this error correcting code.

Also, disclosed in the Japanese Patent Application Publication No. 6-52697 is error correcting technique for semiconductor memory, wherein an odd number of three or more memory cells have the same one bit of the same one address so that error correction is made by determination based on majority voting in readout time.

Such an error correction coding technique as Reed Solomon coding, however, disadvantageously requires much time for decoding contrary to the necessity of promptly reading logical addresses and speedily creating the logical/physical address translation table.

SUMMARY OF THE INVENTION

The present invention has been made in consideration of the above problem, and has its object to provide a method and apparatus for recording and reproducing information capable of realizing high-speed error correction of a specific part of information such as a logical address.

In accomplishing the above object, in accordance with a first aspect of the present invention, there is provided a method of recording and reproducing information in which a recording area of a recording medium is physically divided into small pages and is partitioned into separate physical blocks each having a plurality of the pages so that information is recorded and reproduced in units of the blocks to and from the recording medium. The method comprises steps of, upon recording of information in units of the blocks, recording a specific part of information in a replicated manner into each of the pages within the block; upon reproduction of the information recorded in the recording medium, reading the specific part of information and detecting an error in the read specific part of information; and when the error is detected in the specific part of information, correcting the error in the specific part of information based on a result of majority voting for a plurality of pieces of the specific part of information recorded in the replicated manner into the same block as where the error is detected.

More specifically, the specific part of information for the physical block is recorded in a replicated manner into each of the pages within the block, and when an error is found in the specific part of information, the error is corrected based on a result of majority voting for each of a plurality of pieces of specific part of information recorded in the replicated manner in the same block as where the error is detected. Determination by the majority voting can be done in a shorter time than in the case of decoding employing such an error correction coding technique as Reed Solomon coding.

In accordance with a second aspect of the present invention, there is provided a method of recording and reproducing information according to the first aspect of the present invention, wherein an error correction code is assigned to information in each of the pages, thus allowing error correction of information other than the specific part of information.

In accordance with a third aspect of the present invention, there is provided a method of recording and reproducing information according to the first or second aspects of the present invention, wherein the specific part of information is added with a parity bit that is one bit in size, and the error in the specific part of information is detected by parity checking.

In accordance with a fourth aspect of the present invention, there is provided a method of recording and reproducing information according to the first, second or third aspects of the present invention, wherein the specific part of information is a logical address. Creation of a logical/physical address translation table requires high-speed reading of large numbers of logical addresses. This is successfully accomplished by enabling error correction of the logical address on the basis of majority logic.

In accordance with a fifth aspect of the present invention, there is provided an apparatus for recording and reproducing information that physically divides a recording area of a recording medium into small pages and also partitions the recording area into physical blocks each having a plurality of the pages so as thereby to record and reproduce information in units of the blocks to and from the recording medium. The apparatus comprises a recording device which, when recording information into the block that is unused in the recording medium, records a specific part of information in a replicated manner into each of the pages within the unused block; an error detection device which, when the information recorded in the recording medium is reproduced, reads the specific part of information and detects an error in the read specific part of information; and an error correction device which, when the error is detected by the error detection device, reads a plurality of pieces of the specific part of information recorded in the replicated manner in the same block as where the error is detected, and corrects the error in the specific part of information based on a result of majority voting for the plurality of pieces of read specific part of information.

In accordance with a sixth aspect of the present invention, there is provided an apparatus for recording and reproducing information according to the fifth aspect of the present invention, wherein the recording device calculates an error correction code for information in each of the pages recorded into the recording medium, and records a redundant part of the calculated error correction code together with the information of the page.

In accordance with a seventh aspect of the present invention, there is provided an apparatus for recording and reproducing information according to the fifth or sixth aspects of the present invention, wherein the recording device calculates a parity bit that is one bit in size for the specific part of information in each of the pages recorded into the recording medium, and adds the resultant parity bit to the specific part of information thereby to record the resultant information.

In accordance with an eighth aspect of the present invention, there is provided an apparatus for recording and reproducing information according to the seventh aspect of the present invention, wherein the error detection device detects the error in the specific part of information by applying parity checking to the specific part information in a head page within the block.

In accordance with a ninth aspect of the present invention, there is provided an apparatus for recording and reproducing information according to the eighth aspect of the present invention, wherein the error correction device takes majority voting for each bit of the plurality of pieces of specific part of information and corrects the error bit by bit.

As described above, according to the present invention, the specific part of information for each physical block is recorded, in a replicated manner, in every page within the block, and when an error is detected in the specific part of information, the error is corrected based on a result of majority voting over a plurality of specific part of information recorded in a replicated manner into the block where the error is detected. This allows high-speed error correction of the specific part of information such as a logical address.

BRIEF DESCRIPTION OF THE DRAWINGS

FIG. 3 is a flowchart schematically showing an operation procedure carried out when the information recording and reproducing apparatus according to the present invention is powered on;

FIG. 4 is a flowchart showing a logical/physical address translation table creating procedure carried out immediately after the information recording and reproducing apparatus according to the present invention is powered on;

FIG. 7 is a diagram showing a data structure of each constituent unit in the logical space.

DETAILED DESCRIPTION OF THE PREFERRED EMBODIMENTS

A preferred embodiment of the present invention will be described below in detail with reference to the drawings.

First, a method of recording and reproducing information according to the present invention will be outlined.

A recording area of a recording medium such as a memory card is physically divided into small pages which are typically 512 bytes in size, and is further partitioned into physical blocks each of which comprises a plurality of contiguous pages. Each block is assigned with an address for physical space (physical address). Information is read/written from/to the recording medium in blocks.

Figure 1:
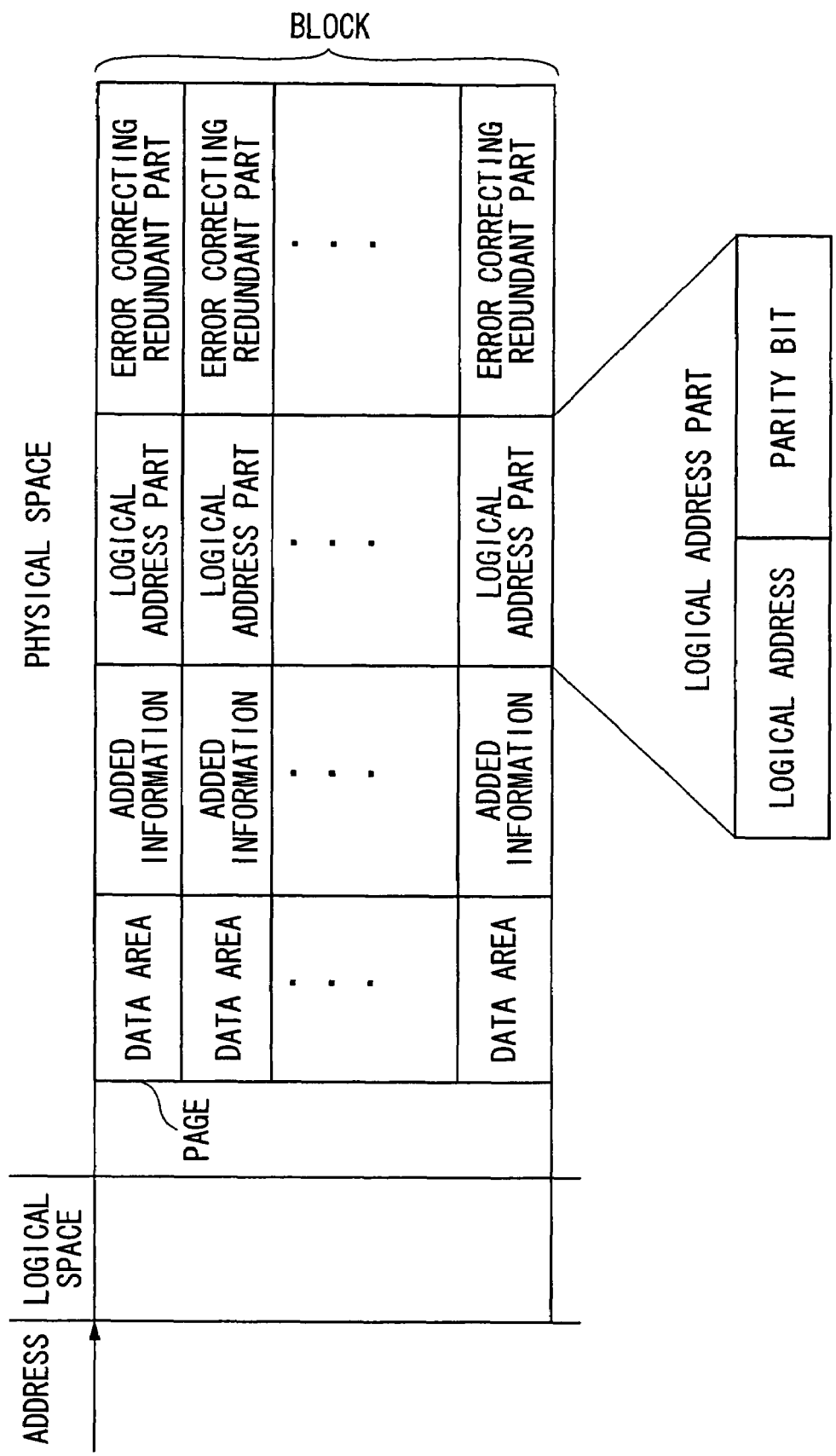
FIG. 1 is a diagram showing a structure of data written into a memory card by an information recording and reproducing apparatus according to the present invention.

Each page according to the present invention comprises, as shown in FIG. 1, a data area, an added information area, a logical address part, and an error correcting redundant part. The data area stores original data, and the logical address part stores a logical address used for assigning each physical block to the logical space and a parity bit (1 bit data) intended for parity checking of the logical address. The error correcting redundant part stores a Reed Solomon code which is calculated for a set of data, added information and logical address stored in each page, as shown in FIG. 7.

According to the present invention, the same logical address is written, in a replicated manner, into each of all pages contained in one block, and in creating the logical/physical address translation table, only the logical address is read from the logical address part of a head page in each block thereby to detect an error in the read logical address through the parity checking. When the error is detected, logical addresses recorded in all pages in the block where the error is detected are read to take majority voting for each bit of the read logical addresses, and consequently the logical address error is corrected based on a result of the majority voting. Note here that each block comprises preferably an odd number of three or more pages, however, four or more even number of pages are also allowable.

Figure 2:
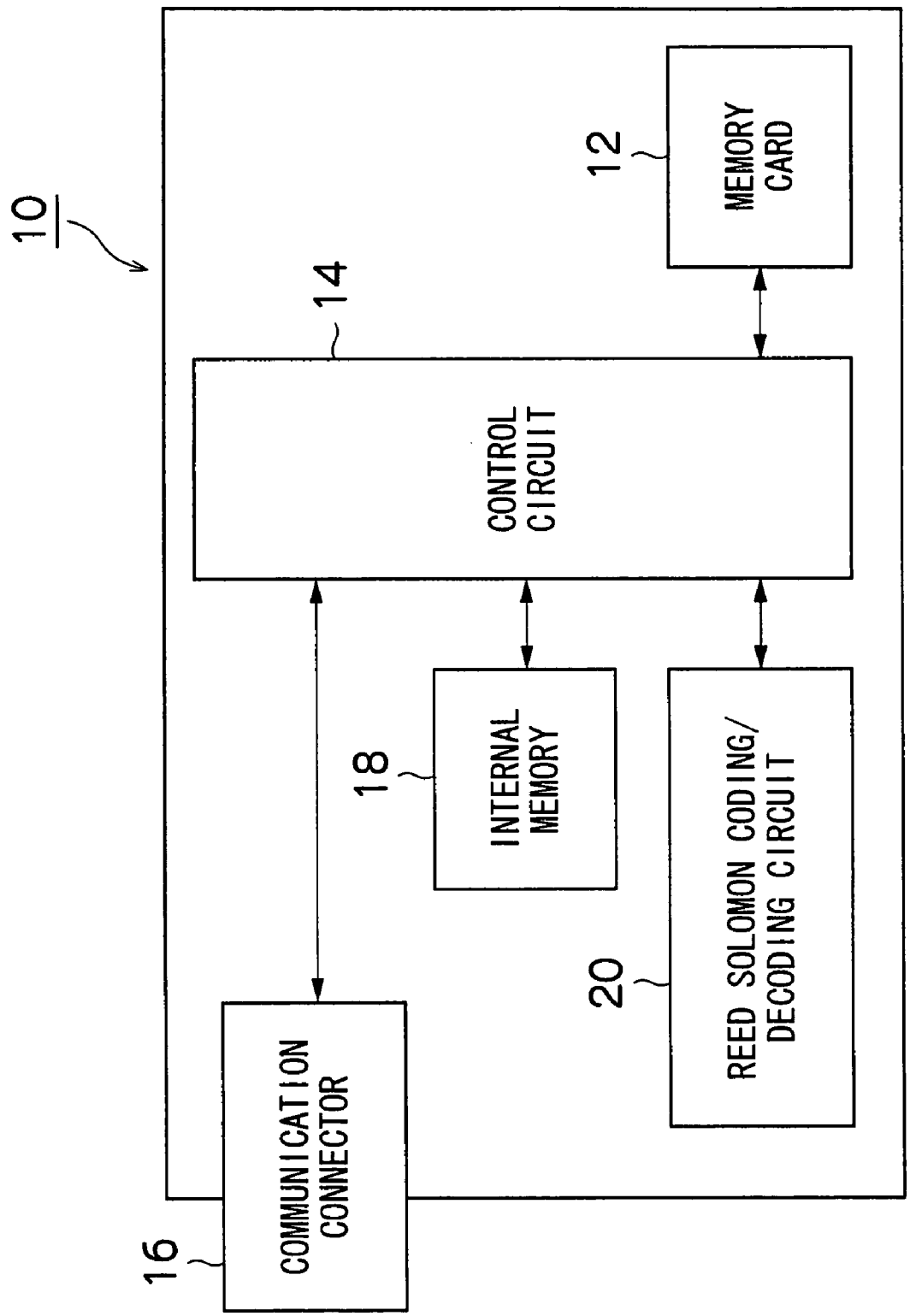
FIG. 2 is a block diagram showing main components of the information recording and reproducing apparatus according to an embodiment of the present invention.

FIG. 2 is a block diagram showing main components of the information recording and reproducing apparatus according to an embodiment of the present invention. An information recording and reproducing apparatus 10 in this embodiment is applicable to electronic devices (e.g. digital cameras, personal computers) operable for reading and writing data from/to a memory card 12, and mainly comprises a control circuit 14, a communication connector 16, an internal memory 18, and a Reed Solomon coding/decoding circuit 20.

The control circuit 14 controls and manages the memory card 12, the communication connector 16, the internal memory 18 and the Reed Solomon cording/decoding circuit 20. When data is input externally via the communication connector 16, the control circuit 14 controls recording the data into the memory card 12. Upon receipt of a readout instruction, the control circuit 14 also controls readout and output of data from the memory card 12. Detailed description of processing executed in reading/writing of data will be provided later.

Referring back to FIG. 7, at the time of writing data into the memory card 12, the Reed Solomon coding/decoding circuit 20 calculates the Reed Solomon code for a fixed unit of recorded contents including data, added information and logical address, and then adds the calculated code to the fixed unit of recorded contents. At the time of reading data from the memory card 12, the Reed Solomon coding/decoding circuit 20 operates for error detection and correction based on the Reed Solomon code added to the fixed unit of recorded contents.

Figure 3:
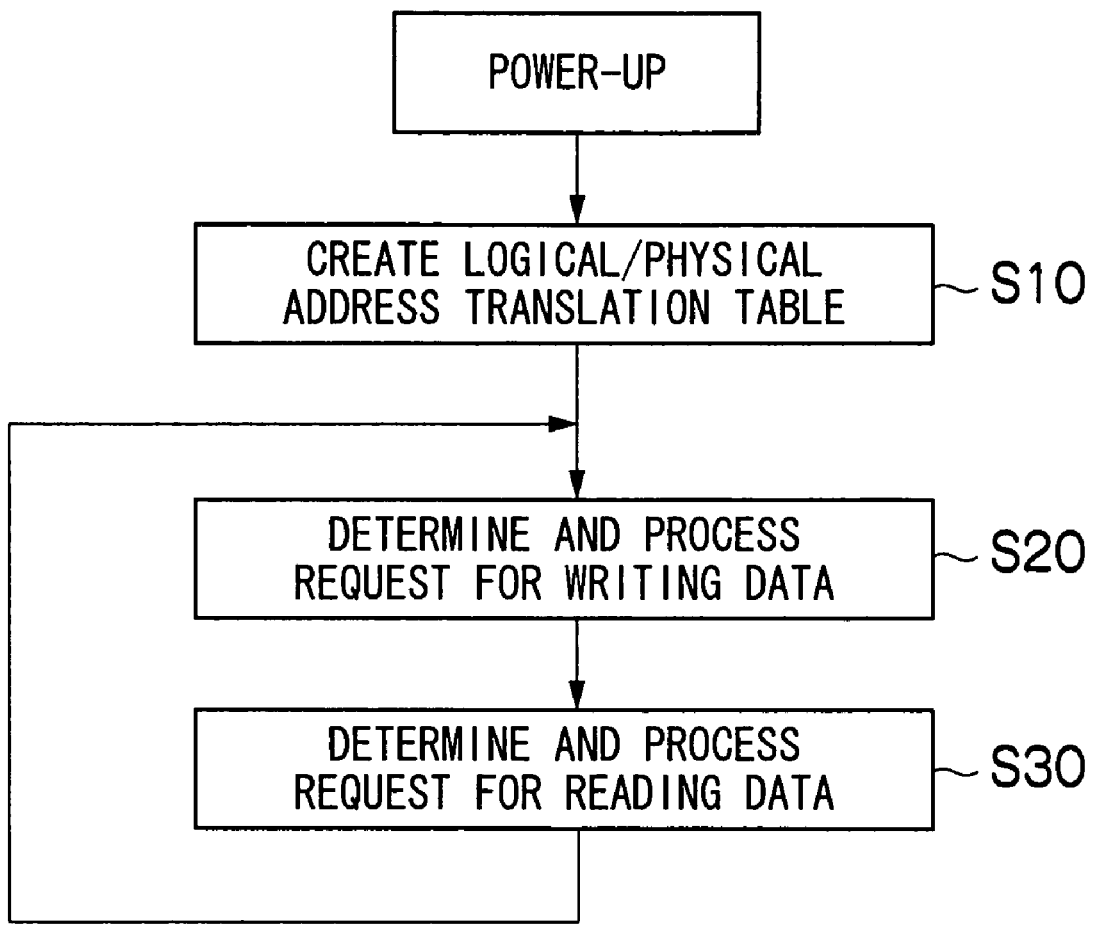

FIG. 3 is a flowchart showing an operation procedure performed when the information recording and reproducing apparatus according to the present invention is powered on.

Referring to this drawing, when the apparatus is powered on, the logical address is read from each of the blocks obtained by physically dividing the recording area in the memory card 12, and a logical/physical address translation table is created which is used to translate the logical address to a physical address (step S11).

When the created logical/physical address translation table is prepared, it is used for reading/writing data from/to the memory card 12 in response to a request (steps S20, S30).

Figure 4:
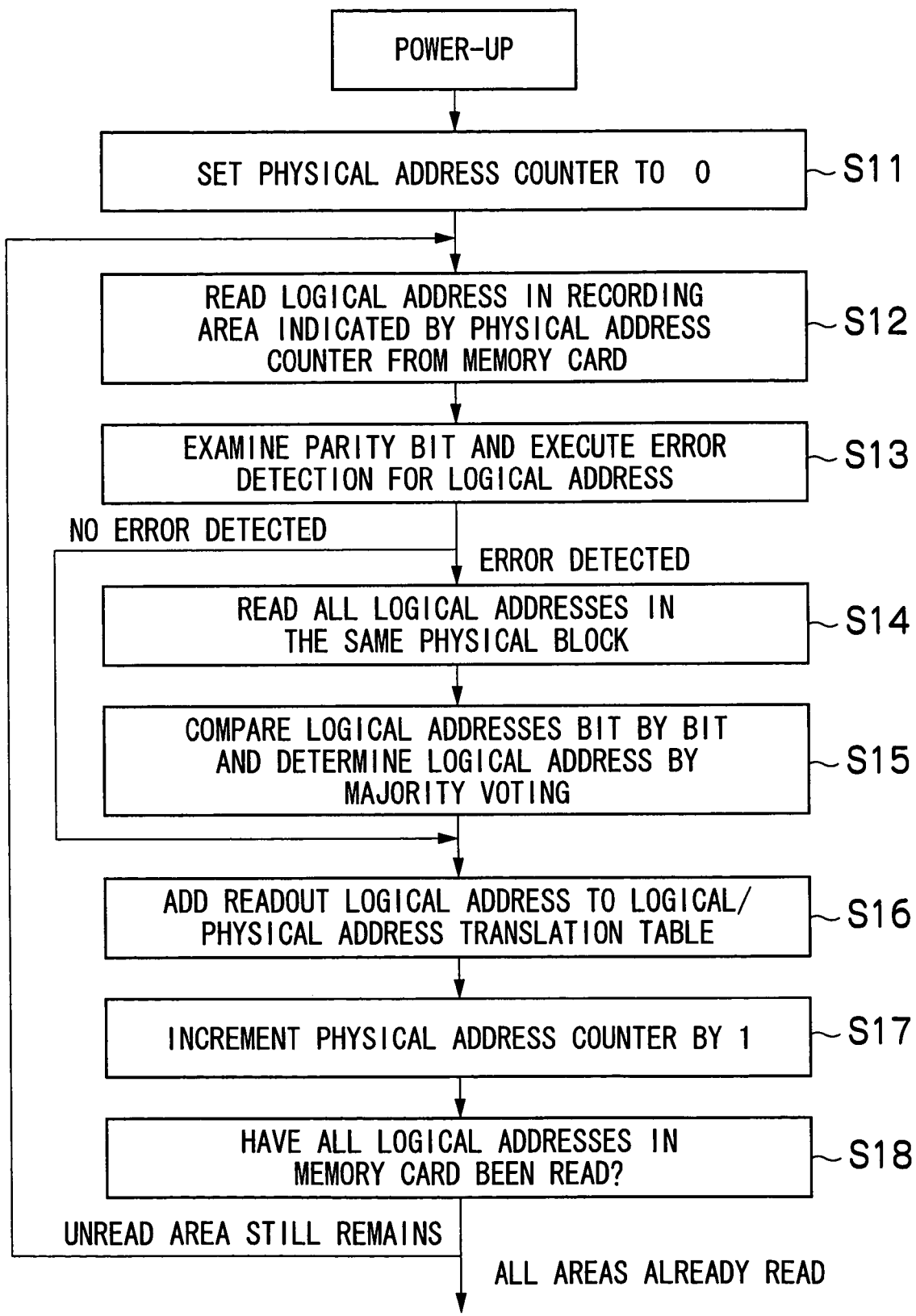

The following paragraphs are about a logical/physical address translation table creating procedure performed immediately after the information recording and reproducing apparatus is powered on, which will be described with reference to the flowchart in FIG. 4.

When the power is turned on, a physical address counter of the memory card 12 is set to zero (step S11).

Next, the logical address and parity bit, which are recorded on the logical address part in the head page of the recording area (block) indicated by a count value of the physical address counter, are read out from the memory card 12 (step S12).

Then, the parity checking is applied to the read logical address using the parity bit thereby to detect a logical address error (step S13). The parity bit is always a one-bit, allowing detection of one bit of error in the logical address.

When the parity checking results in no detection of errors in the logical address, the procedure jumps to step S16, and when an error is detected, logical addressees recorded in a replicated manner in all pages within the same block as where the logical address error is detected are read, as shown in FIG. 1 (step S14). Then, the read logical addresses recorded in the same block are compared bit by bit according to a majority vote method, so that each bit data (i.e., logical address) of those logical addresses is determined based on a result of the majority voting (step S15).

In step 16, a non-erroneous or corrected logical address is added to the logical/physical address translation table.

Next, the count value of the physical address counter is incremented by one (step S17), and based on the incremented count value it is determined whether logical addresses of all blocks in the memory card 12 are read or not (step S18). When reading of the logical addresses in all blocks has not completed, the procedure returns to step S12, and steps S12 to S17 are repeated. When reading of the logical addresses in all blocks has completed, the logical/physical address translation table creating procedure ends.

As described above, in creating the logical/physical address translation table immediately after the power is turned on, the parity checking is applied to the logical address to detect an error thereof, instead of performing the Reed Solomon coding-based error detection and correction. If an error is detected from the logical address, the logical address error is corrected based on a result of the majority voting over a plurality of logical addresses read from the same block as where the logical address error is detected, so that the logical/physical address translation table can be created in a very short time.

Figure 5:
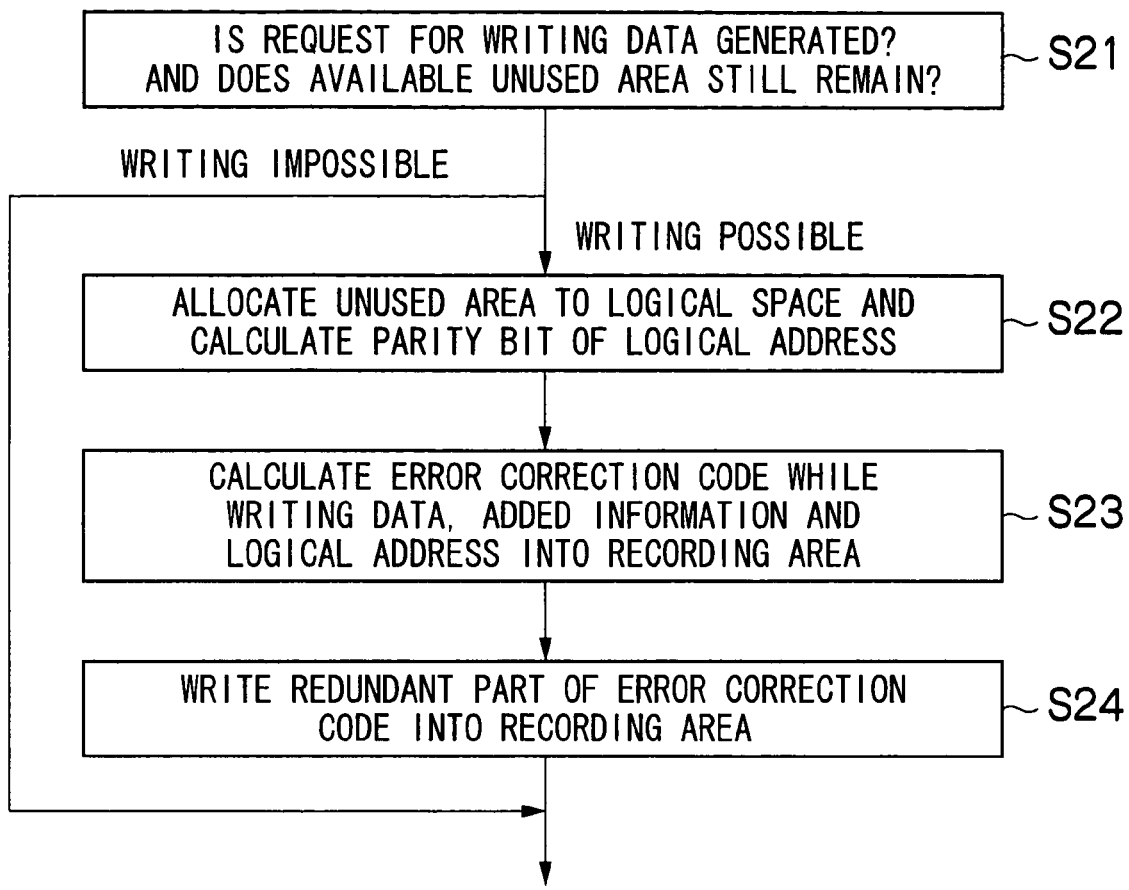
FIG. 5 is a flowchart showing processing executed when a request for writing data into a memory card arises in the information recording and reproducing apparatus according to the present invention.
Figure 6:
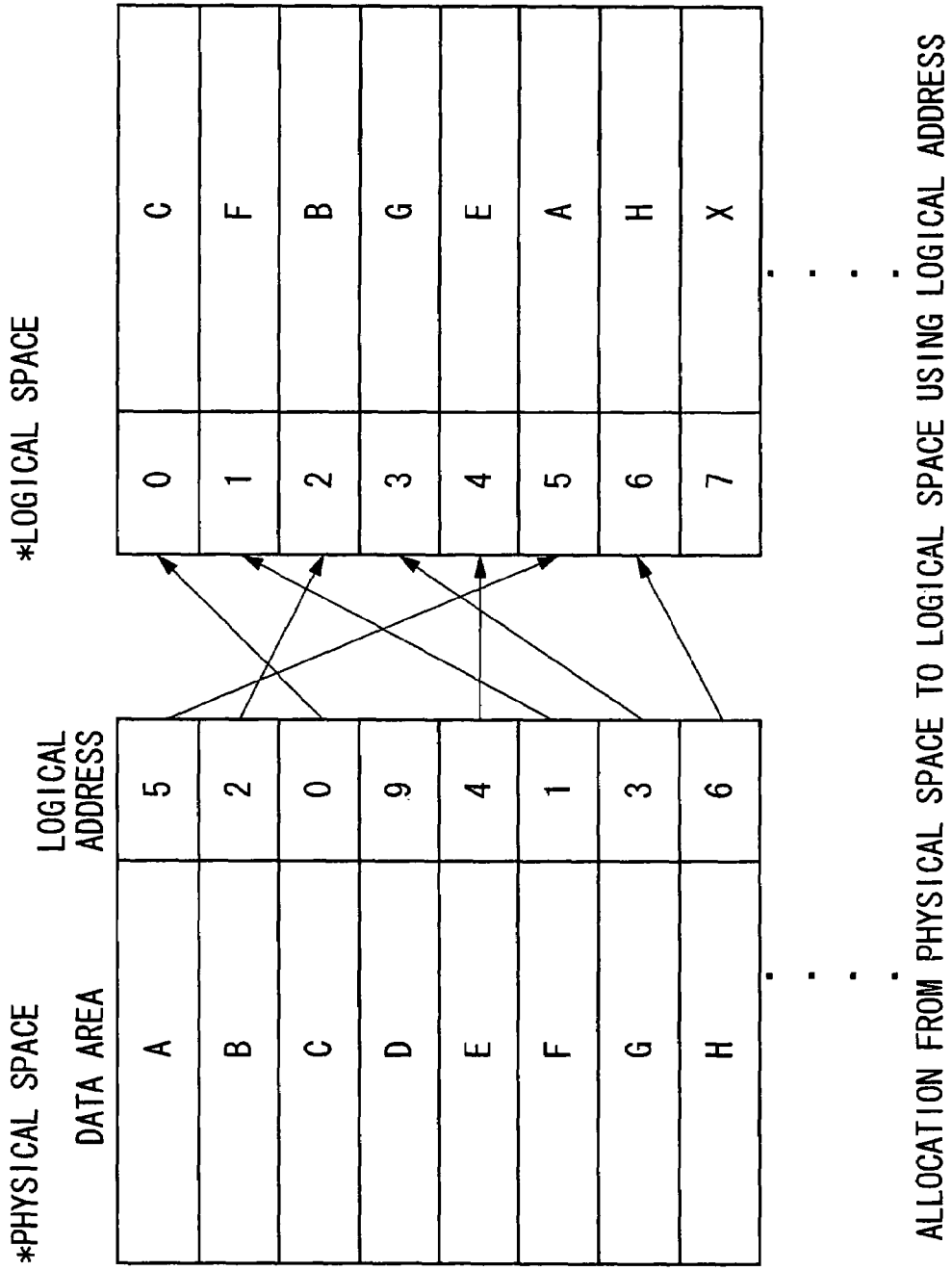
FIG. 6 is a diagram showing allocation of recording areas from physical to logical spaces using logical addresses.

Next, processing executed when a request for writing data into a memory card 12 arises, will be described referring to the flowchart in FIG. 5.

When the request for writing data is generated, it is determined whether the memory card 12 still has an unused recording area (which is a plurality of unused blocks if necessary) sufficient enough to write the data (step S21).

When the sufficient unused block available for writing the data still remains, this block is allocated to the logical space and mapped with a logical address, and also the parity bit of the logical address is calculated (step S22). Subsequently, data, added information and logical address shown in FIG. 1 are written into each page of the block, and simultaneously therewith, the Reed Solomon code is calculated for those data, added information and logical address, which is followed by writing the calculated code into the error correcting redundant part of each page (steps S23, S24).

It should be remarked that the logical addresses each accompanied by the parity bit to be written into the individual pages within one block are all the same. Also, when a plurality of blocks are necessary depending on the size of data to be written, the processes of steps S23 and S24 are repeated in blocks.

While this embodiment has dealt with the case where the same logical address is written, in a replicated manner, into each page in one block, the information written in a replicated manner is by no means limited to the logical address, and other information such as those having small data in size and being read at high speed and in large volume are also allowable.

What is claimed is:

1. An apparatus for recording and reproducing information that physically divides a recording area of a recording medium into small pages and also partitions the recording area into physical blocks each having a plurality of the pages so as thereby to record and reproduce information in units of the blocks to and from the recording medium, the apparatus comprising:

a recording device which, when recording information into the block that is unused in the recording medium, records a specific part of information, in a replicated manner, into each of the pages within the unused block, wherein the recording device calculates a parity bit that is one bit in size for the specific part of information in each of the pages recorded into the recording medium, and adds the resultant parity bit to the specific part of information thereby to record the resultant information;

an error detection device which, when the information recorded in the recording medium is reproduced, reads the specific part of information and detects an error in the read specific part of information, wherein the error detection device detects the error in the specific part of information by applying parity checking to the specific part information in a head page within the block; and an error correction device which, when the error is detected by the error detection device, reads a plurality of pieces of the specific part of information recorded in the replicated manner in the same block as where the error is detected, and corrects the error in the specific part of information based on a result of majority voting for the plurality of pieces of read specific part of information, wherein the error correction device takes majority voting for each bit of the plurality of pieces of specific part of information and corrects the error bit by bit and wherein the corrected specific part of information is added to an address translation table until all the plurality of pieces of the specific part of information in all blocks have been read.

2. The apparatus for recording and reproducing information according to claim 1, wherein the address translation table is created immediately after the power of the apparatus is turned on to initiate the parity checking.

* * * * *